(No Model.)  
3 Sheets—Sheet 1.

G. H. RICH.
OAT CLEANER.

No. 491,594. Patented Feb. 14, 1893.

Witnesses:
Charles O. Shewey.
A. H. Ebbesen.

Inventor:
George H. Rich
by Miles, Greene & Bitner
Attys.

(No Model.) 3 Sheets—Sheet 2.
G. H. RICH.
OAT CLEANER.
No. 491,594. Patented Feb. 14, 1893.
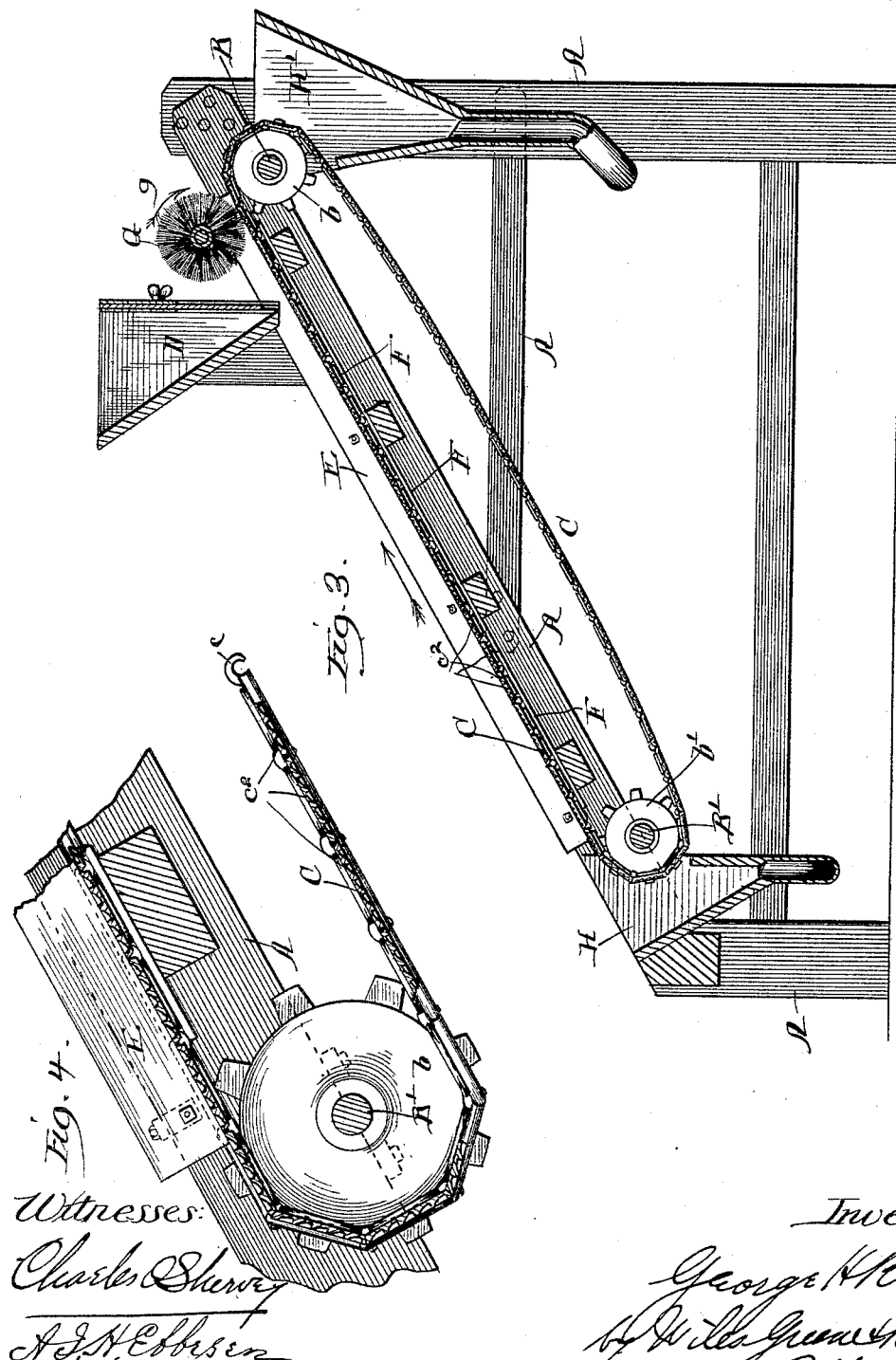
Witnesses:
Charles Sherry
A. J. H. Ebbesen
Inventor:
George H. Rich
by Willes Greene & Bitson
Attys.

(No Model.) 3 Sheets—Sheet 3.

G. H. RICH.
OAT CLEANER.

No. 491,594. Patented Feb. 14, 1893.

Witnesses:
Inventor:
George H Rich

THE NORRIS PETERS CO., PHOTO-LITHO., WASHINGTON, D. C.

UNITED STATES PATENT OFFICE.

GEORGE H. RICH, OF CHICAGO, ILLINOIS.

OAT-CLEANER.

SPECIFICATION forming part of Letters Patent No. 491,594, dated February 14, 1893.

Application filed October 10, 1892. Serial No. 448,283. (No model.)

*To all whom it may concern:*

Be it known that I, GEORGE H. RICH, a citizen of the United States of America, residing at Chicago, in the county of Cook and State of Illinois, have invented certain new and useful Improvements in Oat-Cleaners, of which the following is a specification.

Figure 1:
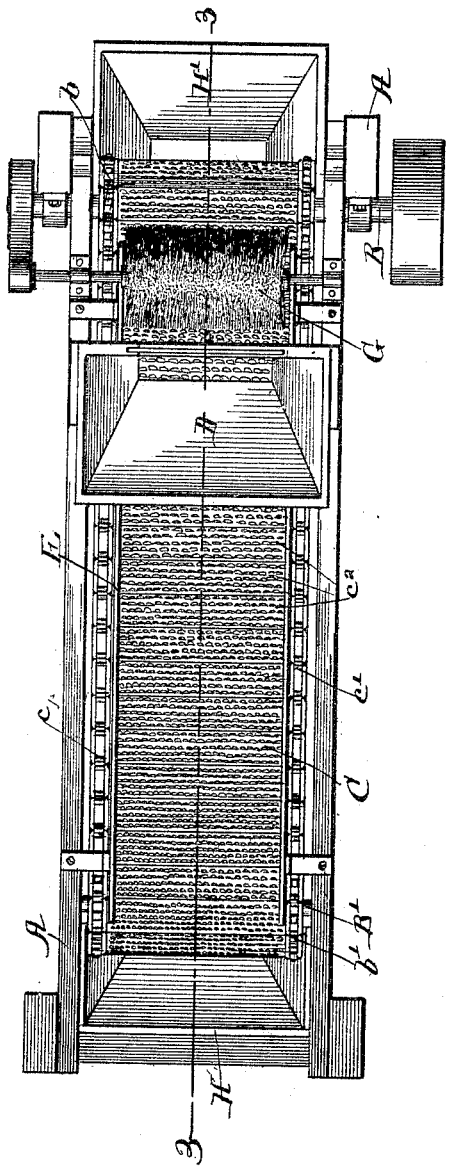
Figure 2:
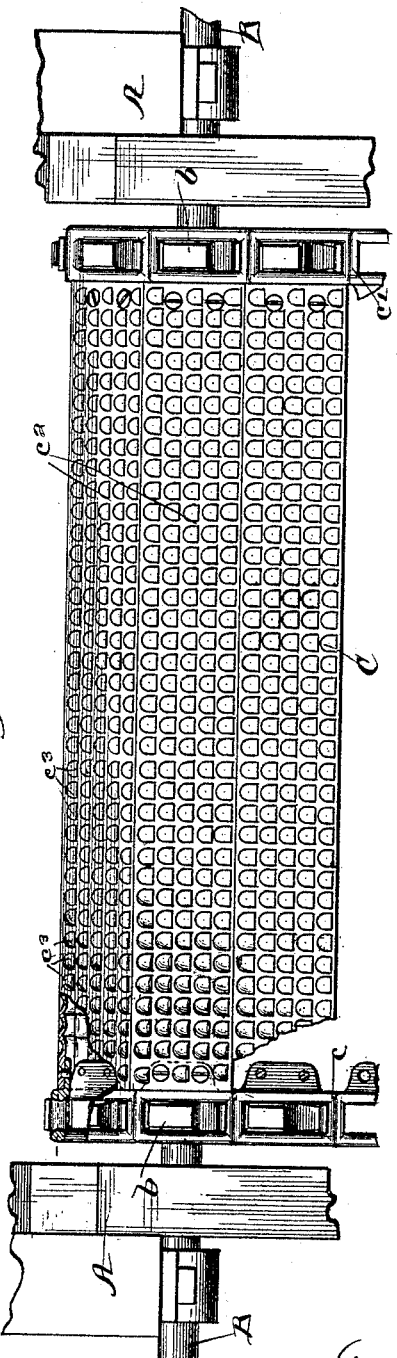
Figures 5, 6:
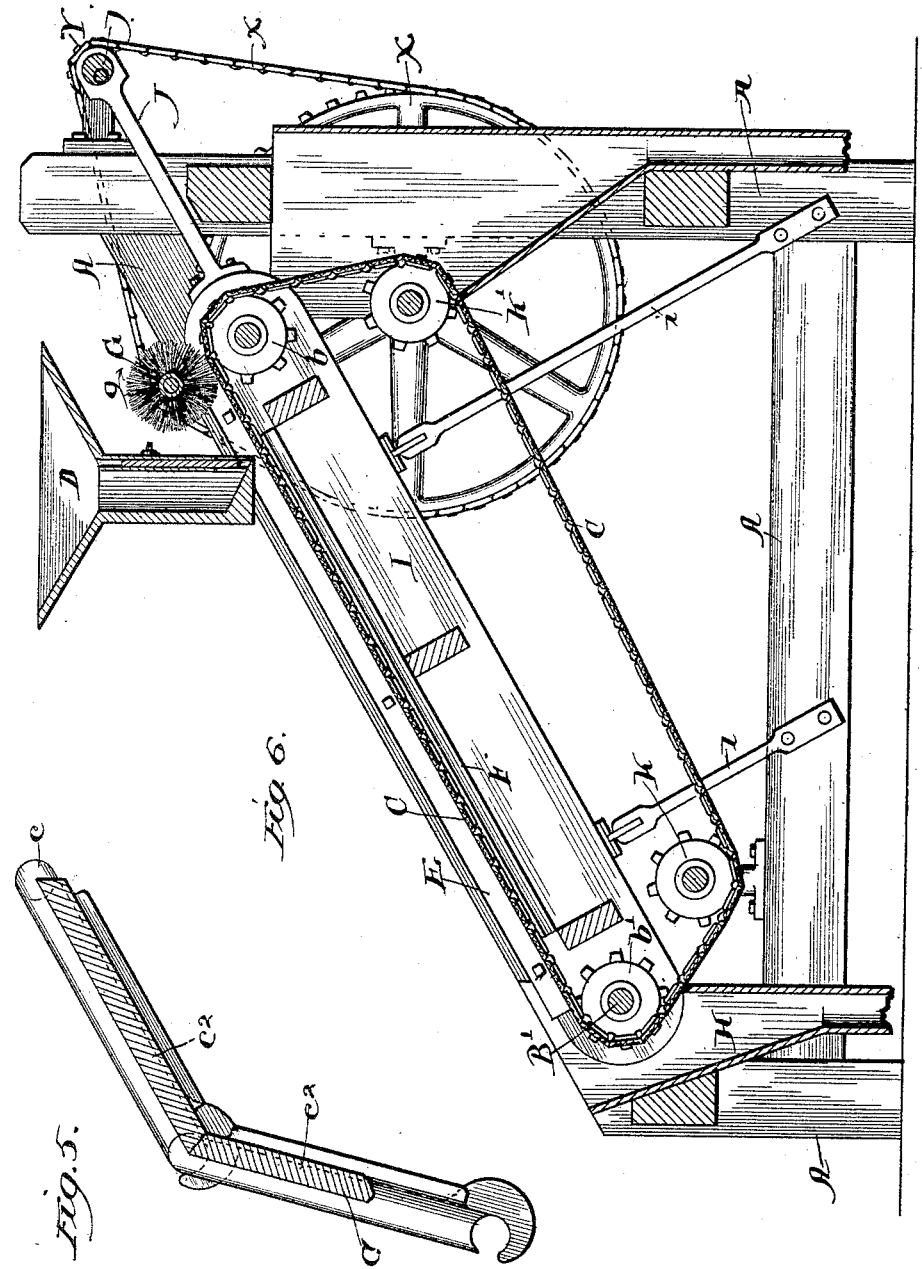

My invention relates to a machine designed for the purpose of freeing oats from such other grains or seeds as are more nearly spherical such as wheat and the seeds of the various grasses and weeds. The difference in shape between the grains of oats and the particles to be separated from them is taken advantage of to effect such separation, and the apparatus, which I have devised, is illustrated by means of six figures in the accompanying drawings; of which, Figure 1 is a general plan view of a complete machine; Fig. 2 is a similar enlarged view showing a portion of the same; Fig. 3 is a vertical section in line 3—3, of Fig. 1; Fig. 4 is a part of said section enlarged; Fig. 5 is a still further enlarged sectional view of the chain belt used in the machine; and Fig. 6 is a vertical longitudinal section of a modification.

Looking at Figs. 1, 2, and 3, the machine will be seen to consist of a frame-work, A, carrying two shafts, B, B', provided at their respective ends within the frame with sprocket-wheels, $b$, $b'$, over which runs a belt, or apron, C, consisting of two link belts, $c$, $c'$, running over the sprocket-wheels at the opposite sides of the machine, and a series of connecting plates, $c^2$. These plates are beveled as seen in Fig. 5, so that their upper surfaces have sharp edges, and these edges are arranged substantially in the pivotal lines of the two link belts, $c$, $c'$, so that in passing around the sprocket-wheels the plates will not separate at the joints. Fig. 5 shows how a considerable bend may be effected without such separation. The plates, $c^2$, are also provided with depressions, $c^3$, which are preferably of the form shown, having square edges upon their lower sides and rounded edges upon their upper sides. While I do not consider this form an essential part of my invention broadly considered, I do find that it is particularly well adapted to my purpose, the square straight edges preventing the smaller and rounder grains from rolling out of the pockets. The pockets are made of such a size that it is impossible for a full sized grain of oats to become lodged in one of them without a portion of it rising above the top of the apron in position to be dislodged either by the grain itself or by a brush hereinafter described which is provided for this purpose. The apron formed by the plates, $c^2$, is placed upon a considerable incline and runs in the direction of the arrows, that is, up the incline. A hopper, D, feeds the uncleaned oats upon the upper portion of the apron and they are allowed to tumble over and over down the same because of their own gravity. They are prevented from running off its sides by strips, E, which rest lightly upon it inside of the linked portions, and the apron is prevented from sagging by means of guides, F, beneath it. As the grain tumbles down the incline, the smaller and round particles which are to be removed find their way into the pockets of the apron and are carried upward by the motion thereof, the passage of the oats over them being ordinarily not sufficient to disturb them, and the length of the apron being so great that it is next to impossible for one of the smaller grains to reach the lower end thereof. Above the hopper, and rotating in the direction of the arrow, $g$, is a brush, G, designed to throw back any of the oats which might accidentally be carried up by the apron. At the lower end of the machine is a hopper, H, to receive the oats and at the upper end a second hopper, H', to receive the particles removed therefrom.

For certain purposes a vibrating apron will be found more satisfactory, and Fig. 6 shows an arrangement for such an apron, the upper portion thereof, the sprocket-wheels, which carry it, and the brush being carried by a frame, I, resting upon spring arms, $i$, and vibrated through an arm, J, by an eccentric, $j$. The lower portion of the apron is carried by sprocket-wheels, K, K', journaled in the frame of the machine so as to avoid shaking said lower portion. The apron in this case receives motion from the sprocket-wheels, K', which are upon a main driving shaft, receiving power by any suitable means. Upon this shaft is also a large sprocket-wheel, X, which transmits the power from the shaft to a sprocket-wheel, Y, upon the shaft which carries the eccentric, j, said power being transmitted by means of a chain, x, which also passes around a sprocket-wheel upon the shaft of the roller, G, and rotates the latter.

I claim as new and desire to secure by Letters Patent:—

1. In a separating machine and in combination with suitable supporting driving and feeding devices, a separating apron comprising two link belts upon opposite sides, and a series of pocketed metal plates filling the space between the two belts, the meeting edges of the upper surface of these plates being substantially in line with the pivotal axes of the links and the lower portions of these edges being beveled away; substantially as described.

2. A traveling apron carried by link belts at its opposite edges and comprising a series of plates extending between the belts, the adjacent upper edges of these plates being substantially in line with the pivotal axes of the links and the lower edges of the plates being beveled away; substantially as shown and described.

GEORGE H. RICH.

Witnesses:
CHARLES O. SHERVEY,
A. I. H. EBBESEN.